June 1, 1971   T. J. STOLKI   3,582,456
COLD-FORMABLE COMPOSITES
Filed May 23, 1969
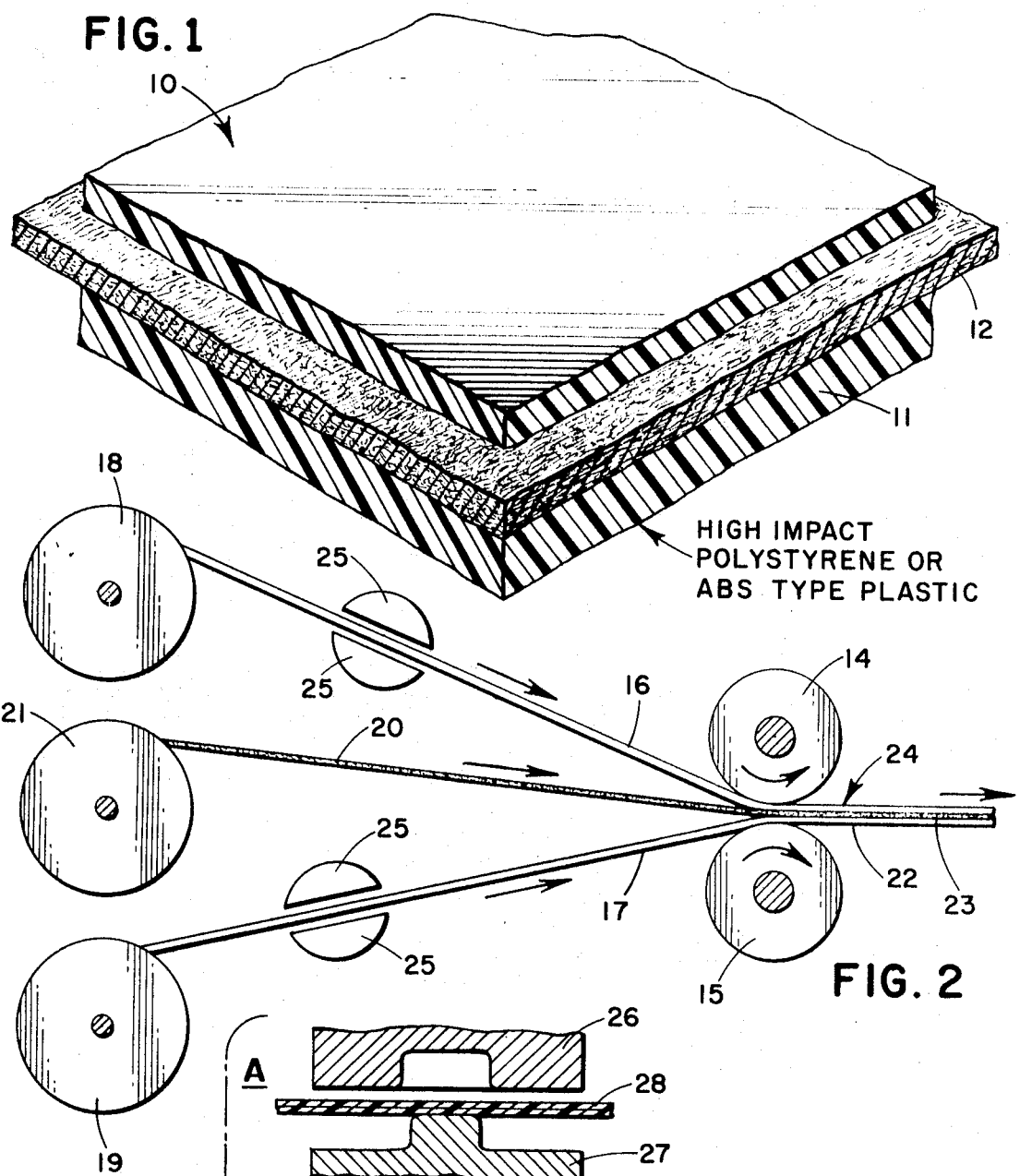
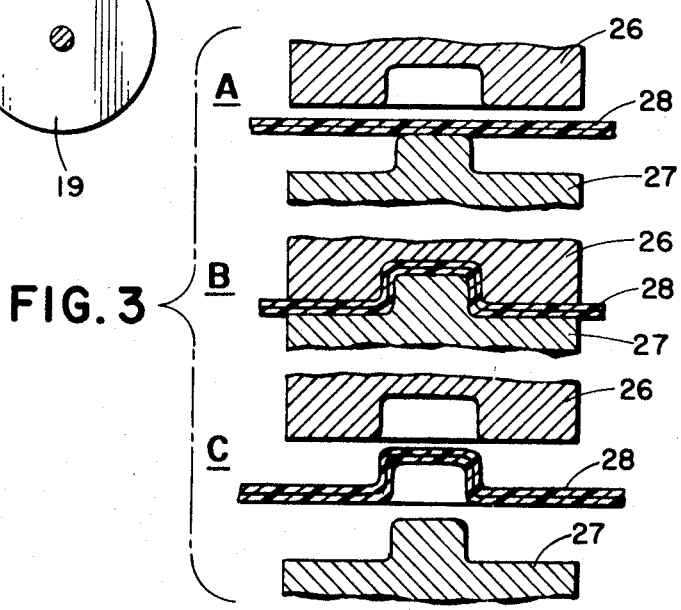
INVENTOR
THOMAS J. STOLKI
BY
JOHN W. KLOOSTER,
ARTHUR E. HOFFMAN,
RUSSELL H. SCHLATTMAN
ATTORNEYS

United States Patent Office 3,582,456
Patented June 1, 1971

3,582,456
COLD-FORMABLE COMPOSITES
Thomas J. Stolki, Wilbraham, Mass., assignor to
Monsanto Company, St. Louis, Mo.
Filed May 23, 1969, Ser. No. 827,273
Int. Cl. B32b 5/16, 15/08
U.S. Cl. 161—165                                5 Claims

ABSTRACT OF THE DISCLOSURE

Composites which utilize a matrix layer of a rubber-modified interpolymer system of monovinyl aromatic compound in which is embedded an interlayer of metallic filamentous material having a generally random pattern. The composites display improved heat resistance and may be cold-formed into articles of manufacture by sheet-metal working procedures.

BACKGROUND

In the art of plastics, there has been a long felt need for sheet-like composites which are both cold-formable and heat resistant in the manner of conventionally formed or worked sheet metal. As used throughout this document, the terms "cold-formable," "cold-formed," and/or "cold-forming," have reference to the fact that a composite can be conformed to a predetermined shape upon the application to at least one face thereof of sufficient pressure to bend the starting composite formed into the desired predetermined shape under substantially room temperature conditions without substantially altering the structure of the composite or deteriorating its inherent physical and chemical properties. Similarly, as used throughout this document, the terms "heat-resistant" and/or "heat resistance" have reference to the fact that a composite has the capacity to resist deformation at elevated temperatures (e.g. at temperatures of about 200° F. or even higher). Heretofore, prior art plastic composites generally have not been cold-formable and/or heat resistant for a number of reasons.

For one reason, prior art composites, especially those containing glass fibers, have tended to crack or become embrittled upon being cold-formed and thereby tend to lose their structural integrity and/or physical strength characteristics.

For another reason, prior art composites were often so expensive and costly as to be completely non-competitive for applications involving the use of sheet metal. Frequently, in the art of plastics and plastic composites, it has been easier from a processing standpoint and from a starting material standpoint to employ heated molding procedures and gluing procedures to fabricate plastic articles of manufacture rather than to employ cold-forming techniques.

There has now been discovered, however, a sheet-like system utilizing a certain class of known plastic materials in a sheet-like form. The sheet-like form has embedded therein an interlayer of metal having a specific form. The product composite has generally unexpected and superior cold-formability and heat resistance properties compared to either respective type of starting material by itself. There have also been discovered methods for making such a class of composites making possible the production of such composites on an economical basis using conventional plastics sheet-forming technology. The result is a product which can be fairly regarded as being competitive with sheet metal from a fabrication and even from a use standpoint.

The composites of this invention have surprisingly improved tensile and flexural characteristics especially at elevated temperatures compared, for example, to a sheet of plastic using only a rubber modified interpolymer system of monovinyl aromatic compound. Furthermore, the resulting laminates have a surprising capacity to be cold-formed using conventional metal working procedures.

SUMMARY

This invention is directed to sheet-like composites which are adapted to be cold-formed and which are heat resistant. These composites utilize at least one matrix layer and at least one interlayer which is positioned within each matrix layer.

Each matrix layer is composed of semi-rigid, solid plastic and has spaced, generally parallel surfaces. Each such layer has an average transverse thickness ranging from about .015 to 0.5 inch, a tensile modulus of elasticity of from about 150,000 to 600,000 lbs./in.$^2$ at 73° F., and a tensile elongation to fail of at least about 5 percent at 73° F., and an impact strength of from about 15 to 100 ft.-lbs. falling dart (measured at 0.1 inch thickness and 73° F.), all such values, of course, being characteristic of the whole layer itself independently. Each matrix layer is in a sheet-like form and comprises a rubber modified interpolymer system of monovinyl aromatic compound as described hereinafter.

Each interlayer is of metal and likewise can be considered to be in a sheet-like form having spaced, generally parallel, surfaces. The interlayer has a transverse average thickness ranging from about 1 to 85 percent (10 to 50 percent preferred) of the total transverse average thickness of the matrix layer.

Each interlayer is taken grossly by itself in a sheet-like form and is composed substantially of generally continuous, generally randomly arranged, discrete filaments whose maximum average cross-sectional dimension in any given interlayer ranges from about 0.5 to 100 mils (1 to 20 mils, preferred). At least about 95 weight percent (based on total interlayer weight) of all the filaments have length-to-width ratios in excess of about $10^3/1$, and preferably in excess of about $10^4/1$. Usually, and preferably, not more than about 5 weight percent (same basis) of all the filaments, in any given interlayer, are cross-sectionally circular, and more preferably not more than 0.5 weight percent (same basis). Although not critical to this invention, preferably each interlayer has a low bulk density (by itself independently in air) as shown by the fact that the interrelationship between metal fibers and open space is such that from about 5 to 70 percent by weight (preferably 15 to 40) of an interlayer comprises filament fibers. An interlayer is positioned substantially completely within a matrix layer and is generally co-extensive therewith (except possibly at extreme edge regions). Preferably each interlayer is more flexible than matrix layer.

This invention is also directed to methods for making such composites, and to the cold-formed articles of manufacture made from such composites.

For purposes of this invention, the term "sheet-like" has reference to sheets, films, tubes, extrusion profiles, discs, cones, and the like, all generally having wall thicknesses corresponding to the thickness of the matrix layer. Those skilled in the art will appreciate that under certain circumstances, three-dimensional sheet-like composites of the invention may, without departing from the spirit and scope of this invention, in effect be filled with some material. In general, a sheet-like composite of the invention is self-supporting, that is, it exists in air at room conditions without the need for a separate solid supporting member in face-to-face engagement therewith in order to maintain the structural integrity thereof without composite deterioration (as through splitting, cracking, or the like).

For purposes of this invention, tensile modulus of elasticity, tensile elongation to fail, flexibility, and the like, are each conveniently measured (using ASTM Test Procedures or equivalent).

A suitable falling dart impact strength measurement test procedure is as follows: A falling dart drop testing apparatus like that described in D–1709–59T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. The test specimen is clamped and held firmly between steel annular rings with an inside diameter of 5 inches. The clamping mechanism is aligned so that the dart strikes the center of the test specimen. The test specimens are preferably 6 inch by 6 inch flat plastic sheets. Specimen thickness should not deviate more than 5 percent from the nominal or average thickness. In a test, the specimen is placed in the clamping mechanism, and the dart is loaded with the weight at which 50 percent failure is expected. Then, the test specimen is impacted with the dart and examined for cracks failure is designated by any crack in the specimen). A new specimen is used for each impact. In the event that the specimen fails (or does not fail), one decreases (or increases) the weight in increments of 0.25 pound until the procedure produces a failure-non-failure (or non-failure-failure) sequence. The results are recorded and the test is preferably continued until at least 15 specimens have been thus tested.

The calculation procedure is as follows:

(A) Record the number of impacts tested after the failure-non-failure (or non-failure-failure) point is reached (N), (B) Add together the dart weights for the N impacts (W), (C) Divide W by N ($W_{50}$), (D) Multiply $W_{50}$ by the drop height (26″) to obtain the 50 percent fail falling dart impact ($F_{50}$).

To determine falling impact for composites of this invention, the following modified procedure may be used. The same dart drop testing apparatus as above is used, except that the dart has a one-inch diameter hemispherical head and the test specimen is not clamped, but is placed on a flat, annular surface. Test specimens are preferably 4 inch by 4 inch flat composites. The procedure and calculations are described as above.

Starting materials—matrix layer

In general, any semi-rigid solid plastic having the characteristics above described can be used as a matrix layer in a composite of this invention, as indicated above. As used herein, the terminology "rubber modified interpolymer system of monovinyl aromatic compound" has reference to:

(A) A graft copolymer produced by polymerizing monovinyl aromatic compound in the presence of a preformed elastomer, and mixtures of such;

(B) A graft copolymer produced by polymerizing monovinyl aromatic compound and at least one other monomer polymerizable therewith in the presence of a preformed elastomer, and mixtures of such; and (C) A mechanical mixture of (A) and/or (B) with optionally either monovinyl aromatic compound polymer, or a copolymer of monovinyl aromatic compound and at least one other monomer polymerizable therewith, or both, and mixtures of such.

As used herein, the term "monovinyl aromatic compound" has reference to styrene (preferred); alkyl-substituted styrenes, such as ortho-, meta-, and para-methyl styrene, 2,4-dimethylstyrene, para-ethylstyrene, p-t-butyl styrene, alpha-methyl styrene, alpha-methyl-p-methyl-styrene, or the like; halogen substituted styrenes, such as ortho-, meta-, and para-chlorostyrenes, or bromostyrenes, 2,4-dichlorostyrene, or the like; mixed halo-alkyl-substituted styrenes, such as 2-methyl-4-chlorostyrene, and the like; vinyl naphthalenes; vinyl anthracenes; mixtures thereof; and the like. The alkyl substituents generally have less than five carbon atoms per molecule, and may include isopropyl and isobutyl groups.

In general, such an interpolymer system has a number average molecular weight ($\overline{M}_n$) ranging from about 20,000 through 120,000, and the ratio of weight average molecular weight ($\overline{M}_w$) to number average molecular weight $\overline{M}_w/\overline{M}_n$ ranging from about 2 through 10.

In general, suitable elastomers for use in this invention can be saturated or unsaturated, and have a glass phase or second order transition temperature below about 0° C. (preferably below about −25° C.), as determined, for example, by ASTM Test D–746–52T, and have a Youngs Modulus of less than about 40,000 p.s.i. Examples of suitable elastomers include unsaturated elastomers such as homopolymers or copolymers of conjugated alkadienes (such as butadiene or isoprene), where, in such copolymers, at least 50 percent thereof is the conjugated alkadiene; ethylene/propylene copolymers, neoprene, butyl elastomers, and the like; and saturated elastomers such as polyurethane, silicone rubbers, acrylic rubbers, halogenated polyolefins, and the like.

A preferred class of elastomers for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile; alkyl acrylates (e.g. methyl acrylate, butyl acrylate, 2-ethylhexyl acrylate, etc.); the corresponding alkyl methacrylates, acrylamides (e.g. acrylamide, methacrylamide, N-butyl acrylamide, etc.); unsaturated ketones (e.g. vinyl methyl ketone, methyl isopropenyl ketone, etc.); alpha-olefins e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A more preferred group of diene polymer elastomers are those consisting essentially of 75.0 to 100.0 percent by weight of butadiene and/or isoprene and up to 25.0 percent by weight of a monomer selected from the group consisting of monovinyl aromatic compounds and unsaturated nitriles (e.g. acrylonitrile), or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Another preferred class of rubbers for use in this invention are acrylic rubbers. Such a rubber may be formed from a polymerizable monomer mixture containing at least 40 weight percent of at least one acrylic monomer of the formula:

(1) 

where
$R_3$ is a radical of the formula:

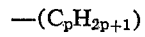

and
$p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinyl-benzene, diallyl maleate, diallyl fumarate, diallyl adipate, allyl acrylate, allyl methacrylate, diacrylates and dimethacrylates of polyydric alcohols, e.g. ethylene glycol dimethacrylate, etc.

One preferred class of monomers for copolymerizing with monovinyl aromatic compounds to produce interpolymer systems suitable for use in this invention as indicated above are alpha-electronegatively substituted ethenes. Suitable such monomers are represented by the generic formula:

(2) 

where

X is selected from the group consisting of —CN,

—$COOR_2$ and —$CONHR_2$ $R_1$ is selected from the group consisting of hydrogen, —$(_nH_{2n+1})$
—$(C_nH_{2n})$—CN, and —$(C_nH_{2n})$—$COOR_2$, $R_2$ is selected from the group consisting of hydrogen, and —$(C_mH_{2m+1})$, $n$ is an integer of from 1 through 4, and
$m$ is an integer of from 1 through 8.

Suitable ethene nitrile compounds of Formula 2 are especially preferred and include acrylonitrile (preferred), methacrylonitrile, ethacrylonitrile, 2,4-dicyanobutene-1, mixtures thereof, and the like.

Suitable acrylic compounds of Formula 2 are especially preferred and include unsaturated acids such as acrylic acid and methacrylic acid; 2,4-dicarboxylic acid butene-1, unsaturated esters, such as alkyl acrylates (e.g. methyl acrylate, ethyl acrylate, butyl acrylate, octyl acrylate, etc.), and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Another preferred class of monomers for copolymerizing with monovinyl aromatic compounds as indicated above are conjugated alkadiene monomers. Suitable such monomers include butadiene, 3-methyl - 1,3 - butadiene, 2-methyl - 1,3 - butadiene, pipérylene chloroprene, mixtures thereof and the like. Conjugated 1,3-alkadienes are especially preferred.

Another preferred class of monomers for copolymerizing with monovinyl aromatic compounds as indicated above are unsaturated esters of dicarboxylic acids, such as dialkyl maleates, or fumarates, and the like.

Considered as a whole, "other monomer polymerizable" with a monovinyl aromatic compound is commonly and preferably an ethylenically-unsaturated monomer.

Optionally, a polymerizatio of monovinyl aromatic compound with at least one monomer polymerizable therewith may be conducted in the presence of up to about 2 weight percent (based on total product polymer weight) of a crosslinking agent such as a divinyl aromatic compound, such as divinyl benzene, or the like. Also optionally, such an interpolymer system may have chemically incorporated thereinto (as through polymerization) a small quantity, say, less than about 2 weight percent (based on total polymer weight) of a chain transfer agent, such as an unsaturated terpene (like terpinolene) an aliphatic mercaptan, a halogenated hydrocarbon, an alpha-methylstyrene dimer, or the like.

In any given rubber-modified interpolymer system of monovinyl aromatic compound used in this invention, there is typically present from about 50 to 98 weight percent of chemically combined monovinyl aromatic compound, from about 0 to 48 weight percent of chemically combined other monomer polymerizable therewith and from about 2 to 50 weight percent elastomer, based on total interpolymer system weight. Preferably, in such a system, there are from 55 to 75 weight percent monovinyl aromatic compound; 5 to 45 weight percent other monomer polymerizable therewith, and from about 5 to 40 weight percent elastomer (same basis). Of course, any given matrix of such a system is chosen so as to have physical characteristics as above indicated. In the case of graft copolymers, and in the case of copolymers of monovinyl aromatic compound and at least one other monomer polymerizable therewith, preferably, the amount of chemically combined monovinyl aromatic compound ranges from about 50 to 85 weight percent and the amount of other monomer polymerizable therewith ranges from about 25 to 15 percent.

Preferred rubber modified interpolymer systems of monovinyl aromatic compounds are graft copolymers of Type (A) above. More preferred such graft copolymers are those of monovinyl aromatic compound, alpha-electronegatively substituted ethene grafted onto preformed elastomer substrate such as polybutadiene; in such a polymer system, the amount of monovinyl aromatic compound typically ranges from about 20 to 95 weight percent (preferably from about 50 to 75 weight percent) while, correspondingly, the amount of chemically combined alpha-electronegatively substituted ethene ranges from about 80 to 5 percent (preferably from about 10 to 25 weight percent). In addition, the amount of chemically combined conjugated alkadiene monomer typically ranges up to about 25 weight percent and preferably from about 5 to 20 weight percent. Such a graft copolymer blend usually has a specific viscosity of from about 0.04 to 0.15, preferably about 0.07 to 0.1, measured as a solution of 0.1 percent of the polymer in dimethylformamide at 25° C.

Styrene and acrylonitrile are presently particularly preferred superstrate monomers. Although the amount of copolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100. With graft ratios above 30:100, a highly desirable degree of improvement in various properties generally is obtained.

The interpolymer systems used in this invention may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or composition. Moreover, it may be desirable to incorporate low boiling organic, inert liquid diluents during a mass polymerization reaction to lower the viscosity, particularly when a rubber is employed. Moreover, the catalyst may be added in increments, or different catalyst may be added at the same time or at different points during the reaction. For example, when a combined mass-suspension process is employed, generally oil-soluble catalysts may be employed; and both low and high temperature catalysts may be advantageously used in some reactions.

Mechanical blends may be prepared by simple, conventional physical intermixing of preformed polymers. Conveniently, one uses starting materials in a solid, particulate form, and employs such conventional equipment as a ribbon blender, a Henschel mixer, a Waring Blendor or the like.

Graft copolymers may be prepared, for example, by polymerizing monomers of the interpolymer in the presence of the preformed rubber substrate, generally in accordance with conventional graft polymerization techniques, involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g. drum-drying, spray-drying, coagulating, etc. Preferably, they are prepared by simply blending a mixture of the interpolymer and the hydroxylated graft copolymer at an elevated temperature for a period of time sufficient to provide an intimate fusion blend of the polymers. Blends of graft copolymer and copolymer can be prepared by simply blending the two polymers together on conventional plastics working equipment, such as rubber mills, screw-extruders, etc.

As suggested above, the rubber modified interpolymer systems used in this invention containing monovinyl aromatic compound, elastomer, and, optionally, at least one other monomer copolymerizable with such monovinyl aromatic compound. In such a system, at least about 2 weight percent of the elastomer present is graft polymerized as a substrate to (as indicated) a superstrate of monovinyl aromatic compound and (optionally and preferably) other monomer polymerizable therewith. Typically, a small amount of the superstrate interpolymer is not in chemical combination with the rubber substrate because of the less-than-100 percent grafting efficiency of conventional graft copolymerization reactions.

The above-described interpolymer systems are generally well known to the prior art and do not constitute part of the present invention. However, they are to be distinguished from prior art polymer systems such as those of styrene only with no appreciable amounts of elastomer present (sometimes known as homopolystyrene, as opposed to what is known, for example, as a graft copolymer of styrene on a preformed elastomer). Thus, polystyrene characteristically is a brittle plastic which has a lower softening temperature, and a lower tensile strength at yield than does such a graft copolymer. In addition, homopolystyrene has different solubility characteristics and thermal stability characteristics than do such graft copolymers. It is the superior combination of properties associated with such graft copolymers which is believed to contribute to making them valuable as starting materials in making the surprising and unexpected composites of the present invention.

It will be appreciated that any given matrix layer used in this invention generally comprises at least about 75 weight percent of at least one such rubber modified interpolymer system of monovinyl aromatic compound with the balance up to 100 weight percent thereof being conventional plastic processing adjuvants, organic or inorganic fillers, flame retardants, antioxidants, stabilizers, plasticizers, and the like. Besides such 75 weight percent of the interpolymer system, and assuming, of course, compatibility with no adverse effect upon the desired end composite properties of improved cold formability and heat resistance, a given matrix layer may also contain a minor percentage, say up to about 15 or 20 weight percent or perhaps somewhat more of another polymer, such as a polyvinyl chloride, a polycarbonate, a polysulfone, a polyphenyleneoxide, a polyamide, or the like, depending upon individual wishes or circumstances, without departing from the spirit and scope of this invention. Fibrous fillers may be used.

Depending on the method of fabricating a sheet-like composite of the present invention, a matrix layer comprising such interpolymer system can be either preformed, or formed in situ around a preformed interlayer. When a matrix layer is preformed, it is conventionally made by the usual extrusion techniques conventionally employed in the plastics industry to make sheets of semi-rigid solid plastic material.

Starting materials—interlayer

Any metal structure having characteristics as above-described can be used as an interlayer in a composite of this invention. Such structures are known to the prior art.

As those skilled in the art will appreciate, the interlayers used in the composites of the present invention and having the characteristics as above defined can be classified as being of the metal wool type.

Metal wool is made by shaving thin layers of steel from wire. Typically, the wire is pulled or drawn past cutting tools or through cutting dies which shave off chips or continuous pieces. Steel wire used for the manufacture of steel wool is of generally high tensile strength and typically contains from about 0.10 to 0.20 percent carbon and from about 0.50 to 1 percent manganese (by weight), from about 0.02 to 0.09 percent sulphur, from about 0.05 to 0.10 percent phosphorus and from about 0.001 to 0.010 percent silicon. Preferably, such wire used as a starting material displays an ultimate tensile strength of not less than about 120,000 pounds per square inch. Metals other than steel are also made into wool by the same processes and when so manufactured have the same general physical characteristics. Thus, metal wools are made from such metals as copper, lead, aluminum, brass, bronze, Monel, metal and nickel, and the like. Techniques for the manufacture of metal wools are well known; see, for examples, U.S. Pat. 888,123; U.S. Pat. 2,256,923; U.S. Pat. 2,492,019; U.S. Pat. 2,700,811; U.S. Pat. 3,050,825, and the like.

Commonly, a single filament of a metal wool has three edges, but may have four or five, or even more. In a given wool, the strands or filaments of various types may be mixed. Finest strands or fibers are commonly no greater than about 0.0005 and the most commonly available type or grade of wool has fibers varying from about 0.002 to 0.004 inches. Commercially, metal wools are classified into seven or nine distinct types or grades. A given metal wool is in the form of a pad or compressed mat of fibers and, as such, is used as an interlayer in composites of this invention. Although the arrangement of fibers in such a pad or mat is generally random, the pad or mat may have imparted thereto a cohesive character by various processes in which groups of fibers are pulled through or twisted with or otherwise mechanically interlocked loosely with other fibers of the whole mat; however, considering the product mat as a whole, the fibers thereof are randomly arranged and in a substantially non-woven condition.

Assuming, of course, compatibility, and no adverse effect upon the desired end composite properties, a given interlayer may optionally be coated, as with a heat-activatable adhesive, as by dipping, spraying, or the like to enhance bonding and adherence between interlayer and matrix layer. Such coatings are within the contemplation of this invention and are generally obvious to those skilled in the art as it exists today at the time of the present invention.

It will be appreciated that while an interlayer need not be bonded to the matrix, such is a preferred condition, in general. Observe that an interlayer is fully enclosed by the matrix layer which always extends between the open spaces in an interlayer in a continuous manner.

In general, it is preferred for purposes of the present invention to preform an interlayer before combining it with matrix layers. The flexibility of the interlayer (that is the ability of an interlayer to be moved transversely in response to a gross force, as compared to a pointed or highly localized force, applied against one face of the interlayer with the end edges of an interlayer sample being positioned in a generally planar configuration) is preferably at least as great as, and more preferably, is appreciably greater than the flexibility of the matrix layer similarly measured but without an interlayer being positioned in such matrix layer.

Methods of fabrication

As indicated above, any convenient technique for making the composites of this invention can be employed. One method which may be used involves the step of first forming a deck of alternating sheets of preformed matrix material and of preformed interlayer such that the opposed faces of the resulting deck each comprise a different one of such matrix sheets. Thereafter, one applies to the opposed faces of the resulting deck elevated temperatures and pressures for a time sufficient to cause matrix layers to flow through open spaces in the interlayer(s), thereby to consolidate the individual members and form the desired composite.

In making a composite of this invention by lamination involving forming or laying up a deck of alternating sheets (as indicated above), it will generally be convenient to employ temperatures in the range of from about 100° C. to 250° C., pressures in the range of from about 10 p.s.i. to 1000 p.s.i. and times in the range of from about 0.1 second to 30 minutes. Pressures, temperatures and times which are greater or smaller than these specific values can, of course, be employed without departing from the spirit and scope of the invention depending on the needs of an individual use situation In general, the lamination conditions are such that the matrix sheets are caused to flow through open spaces in interlayers to form a desired monolithic structure in the composite with no open spaces between the former individual matrix sheet members.

Those skilled in the art will appreciate that when composites of this invention are made using preformed matrix layers and interlayers, continuous or batch processing techniques can be employed. Batch processing techniques are particularly valuable when hand operations are involved while continuous operations are particularly useful when large quantities of composites of this invention are being fabricated. It is convenient to use when forming, for example, a three-layered composite, two preformed rolls of matrix layer and one preformed layer of interlayer so positioned that the interlayer comes between the two matrix layers. As these layers continuously advance they are laminated together between rollers which apply the necessary temperatures and pressures for appropriate times to produce composites of the invention. It will be appreciated that such temperatures and pressures must be applied for times at least sufficient to cause the initially separate but adjacent matrix layers to pass into open spaces in the interlayer and fuse together at points of contact.

Non-planar composites can be made by conventional techniques as those skilled in the art will appreciate. For example, tubes can be made from flat-sheet-like composites by thermoforming the sheets on a form and welding the seams together, as by molding. The tubes can also be produced by continuous extrusion using a tube die and feeding in a preformed cylindrical interlayer to the die. Two dies can be used for continuous lamination or a single die can be used to effectively encapsulate a preformed interlayer. Temperatures generally above the melting point of the particular interpolymer system used are preferably employed (e.g. 125–270° C.). Sometimes roll pressures sufficient to cause fusion through overlapping faces of matrix material are valuable in forming three-dimensional shapes. Typical roll pressures range from about 40 to 400 pounds per lineal inch.

To cold form a sheet-like composite of the present invention, one simply applies in a generally continuous manner sufficient pressure to at least one surface thereof so as to conform the starting composite to a predetermined shape, room temperatures can be employed.

Articles of manufacture made from the composites of this invention generally comprise shaped bodies formed from a sheet-like composite of the invention by applying to such composite (as indicated above) sufficient pressure in a generally continuous manner to convert the starting composite into the desired shaped body.

In general, conventional cold-forming procedures known to the art can be employed including preforming (both by shallow draw stamping and deep draw forming), hydro-forming, drop-forging, explosion-forming, brake-bending, compression molding, and the like.

DESCRIPTION OF THE DRAWINGS

The invention is illustrated by reference to the attached drawings wherein:

FIG. 1 is a greatly enlarged side elevational view of a composite of this invention, some parts broken away, and some parts thereof shown in section;

FIG. 2 is a schematic diagrammatic view of a continuous process for making a composite such as shown in FIG. 1;

FIG. 3, Parts A, B, and C illustrate a cold-forming operation being performed on a sample composite of this invention.

Referring to FIG. 1, there is seen a composite of this invention designated in its entirety by the numeral 10. Composite 10 is seen to comprise a matrix layer 11 and an interlayer 12. The interlayer 12 is a metal wool; the matrix is a rubber modified interpolymer system of monovinyl aromatic compound. The matrix layer extends through open spaces between the wires.

Referring to FIG. 2, there is seen illustrated a continuous process for making a composite of FIG. 1. Into the nip region, existing between a pair of heated pressure rollers 14 and 15, is continuously fed a preformed sheet 16 from a supply roll 18 and a preformed sheet 17 from a supply roll 19, both sheets 16 and 17 being composed of an interpolymer system of monovinyl aromatic compound and alpha-electronegatively substituted ethene compound. Each sheet 16 and 17 is preferably pre-heated by infra-red heaters 25, or the like. Between sheets 16 and 17 is fed a pad or sheet of wire wool 20 from a supply roll 21. As the assembly of sheet 16, wire wool 20, and sheet 17 pass through the nip region between rollers 14 and 15, the assembly becomes fused together so that sheets 16 and 17 are consolidated into a continuous matrix layer 22 which extends through open spaces in the former steel wool 20 which now serves as interlayer 23 in a product composite 24 of this invention. The completed composite 24 can be stored in a sheet-like form before use.

Referring to FIG. 3, Part A, there is seen a female die member 26 and a male die member 27 with a composite 28 of the invention positioned therebetween. When force is applied to the male 27 and female 26 die members so that the two are brought together in mating engagement, the composite 28 positioned therebetween is cold formed into the contours of the die, the resulting appearance of the assembly being as illustrated in Part B of FIG. 3. When thereafter the male 27 and female 26 portions of the die assembly are removed from the now cold-formed composite 28, the composite 28 retains its cold-formed shape and structural integrity and appears as generally illustrated in Part C, of FIG. 3.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples A through K

Twelve inch square sheets composed of rubber modified interpolymer systems of styrene are prepared by extrusion and cutting. The physical characteristics and composition of each such sheet material are given below in Table I.

TABLE I.—MATRIX SHEETS

At 73° F.

| Ex. | Sheet thickness, mils [1] | Tensile modulus elasticity, lbs./in. | Tensile strength, lbs./sq. in. | Tensile elongation, percent | Impact strength, ft.-lbs. falling dart [2] | Composition |
|---|---|---|---|---|---|---|
| A | 30 | 300,000 | 5,100 | 40 | 110 | [3] |
| B | 30 | 340,000 | 6,000 | 35 | 35 | [4] |
| C | 60 | 400,000 | 6,600 | 25 | 25 | [5] |
| D | 125 | 300,000 | 5,100 | 40 | 110 | [3] |
| E | 250 | 300,000 | 5,100 | 40 | 110 | [3] |
| F | 15 | 300,000 | 5,100 | 40 | 110 | [3] |
| G | 60 | 320,000 | 5,500 | 35 | 70 | [6] |
| H | 60 | 330,000 | 6,300 | 20 | 25 | [7] |
| I | 60 | 370,000 | 7,000 | 28 | 20 | [8] |
| J | 30 | 220,000 | 2,200 | 40 | 22 | [9] |
| K | 60 | 300,000 | 5,100 | 40 | 110 | [3] |

[1] 1 mil equals 0.001 inch.
[2] Corrected to .100 inch thickness basis.
[3] A graft copolymer of 82 weight percent styrene/acrylonitrile copolymer superstrate on 18 weight percent butadiene elastomer substrate made according to teachings of U.S. Pat. 3,328,488.
[4] A graft copolymer of 88.5 weight percent styrene/acrylonitrile copolymer superstrate on 11.5 weight percent butadiene elastomer substrate made according to teachings of U.S. Pat. 3,328,488.
[5] A graft copolymer of 92.5 weight percent styrene/acrylonitrile copolymer superstrate on 7.5 weight percent butadiene elastomer substrate made according to teachings of U.S. Pat. 3,328,488.
[6] A graft copolymer of 85 weight percent styrene/acrylonitrile copolymer superstrate on 15 weight percent butadiene elastomer substrate made according to teachings of U.S. Pat. 3,328,488.
[7] A graft copolymer found by analysis to contain about 80 to 85 weight percent styrene/acrylonitrile copolymer superstrate on about 15 to 20 weight percent polyalkyl acrylate ester elastomer substrate available commercially under the trade designation "Luran-S" from Badische Anilin and Soda Fabrik, Germany.
[8] A graft copolymer found by analysis to contain styrene/acrylonitrile/methylmethacrylate terpolymer on a polybutadiene elastomer substrate available commercially under the trade designation "XT" from the American Cyanamid Company and preparable by the teachings of U.S. Pat. 3,354,238.
[9] A mixture of homopolystyrene and a graft copolymer of styrene polymer superstrate on a butadiene substrate containing 92½ weight percent styrene and 7½ weight percent butadiene, the graft copolymer therein having been prepared by the teachings of U.S. Pat. 3,444,270.

Examples L through N

Twelve inch square sheets of metal wool are prepared. The composition and physical characteristics of each such sheet type are given below in Table II.

TABLE II

| Example | Interlayer thickness [1] | Average max. individual fiber cross-sectional dimension (inches) | Type metal | Apparent length-to-width ratio of more than 95 weight percent |
|---|---|---|---|---|
| L | 0.25 | .002–.004 | Steel [2] | In excess 10³/1. |
| M | 0.25 | .002–.004 | Brass | Do. |
| N | 0.35 | .010–.020 | Steel [2] | Do. |

[1] Inches, measured in air under no load.
[2] Made from steel wire having an ultimate tensile strength over 120,000 pounds per square inch and believed to contain from about 0.10 to 0.20 percent carbon, from about 0.50 to 1 percent manganese, and from about 0.02 to 0.09 percent sulphur.

Examples 1 through 12

A series of composites of this invention are each prepared as follows from the materials of respective Tables I and II above by the following procedures: Two sheets of a plastic sheet material from Table I are placed together in face-to-face engagement with a single sheet of interlayer from Table II positioned inbetween. The resulting three-layered construction is placed in a press and subjected to a temperature of about 350–400° F. using a pressure of about 500 lbs./in.² for a time of about 20 minutes and thereafter is removed and allowed to cool to room temperature. Each product composite has the respective plastic sheet members bonded continuously together through the open spaces in the interlayer. Constructional details are reported below in Table III.

In Examples 1 through 4, the relative flexibility of the matrix layer compared to the interlayer is shown by the following test procedure which is carried out in each instance at approximately 73° F.: A frame 12 inches square equipped with a flange ½ inch wide is used as a base on which is positioned, successively, sheets of material from Tables I and II, respectively. When 12 inch square sheet material from Table I is being placed on this frame, two such sheet members are always employed, one stacked congruently one over the other, in a resulting composite of this example, two such sheet members previously fused together to form a single matrix layer. Upon each pair of sheet members employed as a matrix layer, a five pound weight is positioned in approximately the center of the top sheet. In each instance, a very slight deflection downwards is observed. When each sheet of material from Table II is placed on this frame individually (as employed as interlayers) and similarly loaded with a five pound weight, the resulting weight causes such sheet material to deflect so much that it and the weight falls through the frame showing that each such sheet material lacks the strength and has too much flexibility to support the five pound weight. Accordingly, it is concluded that the flexibility of each interlayer is very much greater than that of the matrix layer.

The heat resistance of each product composite of Examples 1 through 4 is demonstrated by the fact that a cantilever beam thereof (a sample about 1 inch by 6 inches which is clamped on an end thereof) resists deflection downwards when exposed for a measured interval at a temperature of about 130° C. Such is in sharp contrast to the behavior of an equivalent matrix layer (two sheets of material from Table I laminated together by the fusion procedure used to make a composite of this invention but without the interlayer positioned therebetween) when subjected to a similar heat treatment because such control sample deflects and points downward when subjected to such heat for such times. Results are reported in Table III below.

The cold formability of each of the composites of Examples 1 through 3 is demonstrated by the fact that when a sample of each such product composite in the form of a 1½" disc blank is inserted between the mating members of a hemispherical die assembled approximately 1 inch in diameter (½ inch radius) and sufficient pressure is applied to the die members to cold form the product composite between the mating die members so as to produce a finished part approximately ½ inch in depth and 1 inch in diameter in such composite sheet, the resulting composite sheet sample retains its structural integrity upon being removed from such die members. Results of some such testing for capacity to be cold formed are reported in Table III below.

In the remaining examples beyond Example 4, each composite is prepared using a procedure described for Examples 1 through 4. When the materials used in each such product composite are evaluated for relative flexibility of matrix layer compared to interlayer using an analogous test procedure to that described above, it is concluded that the flexibility of each interlayer is very much greater than that of the matrix layer. Similarly, when the heat resistance of each product composite and the cold-formability of each product composite is demonstrated by analogous tests to those described respectively above, it is concluded that each product composite's heat resistance and cold-formabiilty are superior to those of an equivalent matrix layer alone.

and subjected to a temperature of about 350° F. and a pressure of about 500 lbs./in.² for a time of about 20 minutes, and thereafter removed and allowed to cool

TABLE III.—COMPOSITES

| Example No. | Designation (Table I) | Total transverse average thickness (inches) | Designation (Table II) | Percent transverse average thickness of whole composite | Thermal Stability, percent deflection at 130° C. Heating time (min.) | | | | Cold-formable (yes or no) |
|---|---|---|---|---|---|---|---|---|---|
| | | | | | 0 | 40 | 400 | 1,440 | |
| Control | A | .060 | (¹) | (¹) | 0.0 | 76.9 | 92.4 | 92.4 | Poorly. |
| 1 | A | .060 | L | 17 | 0.0 | 31.1 | 38.6 | 42.7 | Yes. |
| 2 | K | .120 | L | 20 | 0.0 | 48.3 | 59.7 | 64.6 | Yes. |
| 3 | F | .030 | L | 45 | 0.0 | 28.2 | 32.7 | 37.4 | Yes. |
| Control | J | .060 | (¹) | (¹) | 0.0 | 85.1 | 100 | 100 | Poorly. |
| 4 | J | .060 | L | 17 | 0.0 | 25.9 | 36.1 | 39.5 | Yes. |
| 5 | B | .060 | L | 17 | (²) | (²) | (²) | (²) | Yes. |
| 6 | C | .060 | L | 17 | (²) | (²) | (²) | (²) | Yes. |
| 7 | D | .240 | N | 6 | (³) | (³) | (³) | (³) | Yes. |
| 8 | E | .50 | N | 3 | (⁴) | (⁴) | (⁴) | (⁴) | Poorly, but forms. |
| 9 | F | .030 | M | 33 | (⁵) | (⁵) | (⁵) | (⁵) | Yes. |
| 10 | G | .120 | L | 15 | (⁶) | (⁶) | (⁶) | (⁶) | Yes. |
| 11 | H | .120 | L | 15 | (⁶) | (⁶) | (⁶) | (⁶) | Yes. |
| 12 | I | .100 | L | 10 | (⁶) | (⁶) | (⁶) | (⁶) | Yes. |

¹ None.
² Deflection after 400 minutes (<50%).
³ Deflection after 400 minutes (<70%).
⁴ Deflection after 400 minutes (<80%).
⁵ Deflection after 400 minutes (<40%).
⁶ Deflection after 400 minutes (<60%).

Example 13

The following examples illustrate fabrication of composites of this invention by a continuous extrusion process.

A continuous length of steel wool like that of Example L in Table II above is prepared. Such wool is continuously extrusion laminated between a pair of (correspondingly) continuous lengths each 40 inches wide of plastic material each of whose composition and physical properties are identical to those of Type A in Table I above, except that thickness here is 35 mils and length and width dimensions are as shown.

The lamination procedure for making continuously a composite involves inserting the steel wool interlayer between a pair of sheets of such plastic material at the nip region existing between the separate sheets as they are being brought together into face-to-face engagement over a polished steel roll about 12 inches in diameter. Velocity of the laminate over the roller is about 4 ft./min. The surface of the matrix in the region where the laminate passes is heated to a temperature of about 300° F. by a bank of infra-red heaters. The product laminate composite is cooled to room temperature and coiled on a roll.

When evaluated for heat resistance and cold formability in the manner described in relation to Examples 1–12 above, superior such properties are observed.

Examples 14 and 15

Two samples of the composite of Example 1 are placed together in face-to-face engagement and placed in a heated press and subjected to a temperature of about 350° F., and a pressure of about 500 lbs./in.² for a time of about 10 minutes and thereafter removed and cooled to room temperature. The product is a composite having a matrix layer in which are embedded two interlayers.

When evaluated for thermal stability and cold formability by using the procedures described above in reference to Examples 1–12, superior thermal stability and cold formability (compared to a matrix layer by itself) are observed.

When the foregoing procedure is repated with two samples of the composite of Example 4, similar results are obtained.

Example 16

A sheet of plastic sheet material designated A in Table I, an interlayer designated K in Table II, and a second sheet of plastic material designated J in Table I are laid up in face-to-face engagement with one another with interlayer L mediate between sheet A and D. The resulting three-layered construction is placed in a press and subjected to a temperature of about 350° F. and a pressure of about 500 lbs./in.² for a time of about 20 minutes, and thereafter removed and allowed to cool to room temperature. The product is a composite having a matrix layer in which is embedded a single interlayer, but in which the matrix layer is composed of two different interpolymer systems of monovinyl aromatic compound and alpha-electronegatively substituted ethylene compound.

When evaluated for thermal stability and cold formability by using the procedures described above in reference to Examples 1–12, superior thermal stability and cold formability (compared to such a matrix layer by itself) are observed.

Such mixtures of interpolymer systems to form a matrix layer are fully within the spirit and scope of this invention.

The composites of this invention are generally characterized by dimensional stability and substantial freedom from stress cracking over wide environmental temperature ranges.

What is claimed is:

1. A sheet-like composite which is adapted to be cold-formed and heat resistant comprising:
   (A) a matrix layer of semi-rigid, solid plastic having spaced, substantially parallel, opposed faces, said layer comprising a rubber modified interpolymer system of monovinyl aromatic compound and alpha-electronegatively substituted ethene compound and said layer being characterized by:
      (1) having a transverse average thickness ranging from about 0.015 to 0.5 inch,
      (2) having a tensile modulus of elasticity of from about 150,000 to 600,000 lbs./in.² at 73° F.,
      (3) having a tensile elongation to fail of at least about 5 percent at 73° F.,
      (4) having an impact strength of from about 15 to 200 ft.-lbs. falling dart (at 0.1 inch thickness and 73° F.), and
   (B) an interlayer of metal having spaced, substantially parallel, opposed faces, said interlayer comprising substantially continuous, substantially randomly arranged discrete filaments whose average maximum cross-sectional dimension ranges from about 0.5 to 100 mils and at least 95 weight percent (based on total interlayer weight) of all such filaments have length-to-width ratios in excess of about 10³/1 and said interlayer ahving a transverse average thickness ranging from about 1 to 85 percent of the total transverse average thickness of said matrix layer,
   (C) said interlayer being positioned substantially completely within said matrix layer and substantially coextensive therewith to form a monolithic structure in the composite with substantially no open spaces.

2. The composite of claim 1 wherein said interlayer comprises a steel wool.

3. The composite of claim 2 wherein said interlayer comprises a brass wool.

4. The composite of claim 1 wherein said matrix layer comprises an interpolymer system of styrene, acrylonitrile and butadiene.

5. The composite of claim 1 wherein said matrix layer has two of said interlayers therewithin, each of said interlayers being separated one from the other by a generally uniform thickness of matrix composition.

References Cited
UNITED STATES PATENTS

| | | | |
|---|---|---|---|
| 2,689,200 | 9/1954 | Johnson | 161—151 |
| 2,754,730 | 7/1956 | French | 161—156 |
| 2,845,650 | 8/1958 | Ashley et al. | 161—151 |
| 2,986,242 | 7/1959 | Winch | 161—170 |
| 2,949,394 | 8/1960 | Rodman | 161—170 |
| 3,118,854 | 1/1964 | Hess et al. | 151—165 |
| 3,158,526 | 11/1964 | Farnam et al. | 161—165 |
| 3,184,368 | 5/1965 | Juras | 161—170 |
| 3,438,845 | 4/1969 | Cohen et al. | 161—253 |

HAROLD ANSHER, Primary Examiner

G. W. MOXON II, Assistant Examiner

U.S. Cl. X.R.

161—156, 170, 217, 218, 253, 254, 255, 256